(12) United States Patent
Rosner et al.

(10) Patent No.: US 7,840,900 B1
(45) Date of Patent: Nov. 23, 2010

(54) REPLACING RESET PIN IN BUSES WHILE GUARANTEEING SYSTEM RECOVERY

(75) Inventors: Stephan Rosner, Campbell, CA (US); Qamrul Hasan, Santa Clara, CA (US); Roger Dwain Isaac, Santa Clara, CA (US)

(73) Assignee: Spansion LLC, Sunnyvale, CA (US)

( * ) Notice: Subject to any disclaimer, the term of this patent is extended or adjusted under 35 U.S.C. 154(b) by 0 days.

(21) Appl. No.: 12/433,499

(22) Filed: Apr. 30, 2009

(51) Int. Cl.
*G06F 15/00* (2006.01)
*G06F 13/00* (2006.01)

(52) U.S. Cl. ...................... 715/734; 715/740

(58) Field of Classification Search ......... 715/734–738, 715/740–746, 748–751, 763–765; 709/209, 709/221; 714/758, 759
See application file for complete search history.

(56) References Cited

U.S. PATENT DOCUMENTS

| | | | |
|---|---|---|---|
| 4,774,422 A | 9/1988 | Donaldson et al. | |
| 4,779,196 A | 10/1988 | Manga | |
| 4,931,748 A | 6/1990 | McDermott et al. | |
| 6,066,988 A | 5/2000 | Igura | |
| 6,516,366 B1 * | 2/2003 | Gates et al. | 710/105 |
| 6,904,484 B1 | 6/2005 | Nelson | |
| 2008/0307287 A1 * | 12/2008 | Crowell et al. | 714/758 |
| 2009/0205050 A1 * | 8/2009 | Giordano et al. | 726/26 |

* cited by examiner

*Primary Examiner*—Cao (Kevin) Nguyen
(74) *Attorney, Agent, or Firm*—Eschweiler & Associates, LLC

(57) ABSTRACT

Systems and methods are disclosed that replace a separate reset pin in a bus with a reset command that guarantees a system recovery. The system comprises a host component circuitry residing on a first chip and a client component circuitry residing on a second, different chip. A bus connects the host component circuitry to the client component circuitry. The host component circuitry is configured to transfer an initial client value associated with a client component time period to the client component circuitry over the bus on a periodic time basis. The periodic time basis is dictated by a host component time period and the client component time period is greater than the host component time period. The client component circuitry is configured to initiate a reset procedure if the client component time period expires which indicates that the initial client value was not received at a next time on the periodic time basis dictated by the host component time period.

21 Claims, 3 Drawing Sheets

REPLACING RESET PIN IN BUSES WHILE GUARANTEEING SYSTEM RECOVERY

FIELD OF INVENTION

The invention is generally related to the field of system and memory buses and more particularly to a system and method to replace a separate reset pin with a reset command without the necessity for the client component circuitry to monitor the control client component circuitry in order to ensure control of the system.

BACKGROUND OF THE INVENTION

Microprocessor devices ("processors") utilize external pins to interface with other components within a computer system. In present computer technology, as the complexity and processing power of microprocessors grow, the number of external pins required to interface the host microprocessor with the other components of the computer system also increases. Those other components include a plurality of separate devices such as processors, memories, and peripheral devices, interconnected by one or more buses. Decreasing the number of external pins decreases the cost of the microprocessor and/or the system and memory buses as well as decreases the cost and complexity of the interface circuitry.

Computer networks often use what is known as a "client/server system" in which a network host or "host computer" can provide centralized hardware, computation, database access, software resources and network control functions for a number of "client computers" in the network. The client/server model has become one of the central approaches of network computing. Most of the business applications being written today use the client/server model. Traditional network architectures arrange the network server and clients as separate and individually controlled units. Each client is typically a stand-alone PC computer, and as such can operate independently of the network host. Likewise the server is generally a fully independent computer, and is capable of independent processing, power cycling and reset/re-initialization.

Most of these client/server systems contain a reset signal if the host and the client lose connection. The reset signal typically requires a separate reset pin which reduces pin efficiency because it is rarely used and therefore does not contribute to increasing the data flow through the pins on the system and memory buses. The main reason for reset pins is to provide a guaranteed method to force the system into a predetermined state in the case of error conditions in the system, wherein the host can always reset the client through the reset pin.

A traditional reset command transferred through a control bus, for example, cannot replace the reset pin because that assumes that the client continuously monitors the control bus and reacts correctly to the reception of a reset command from the host. However, this is not the case, because if the client does not honor a reset command from the host, the system can remain in an un-deterministic state.

This type of reset scheme applies also to bus structures within a single computer, rather than to two networks, such as a host component circuitry (e.g., a processor instead of a computer) and a client component circuitry (e.g., a memory or modem device instead of another computer).

Accordingly, there is a need to provide a system and method for reducing the pin count of a microprocessor. These and other advantages of the present invention not specifically recited above will become apparent within discussions of the present invention herein.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later.

One aspect of the invention provides a system that replaces a separate reset pin in a bus with a reset command to guarantee a system recovery. The system comprises a host component circuitry residing on a first chip and a client component circuitry residing on a second, different chip. A bus connects the host component circuitry to the client component circuitry. The host component circuitry is configured to transfer an initial client value associated with a client component time period to the client component circuitry over the bus on a periodic time basis. The periodic time basis is dictated by a host component time period and the client component time period is greater than the host component time period. The client component circuitry is configured to initiate a reset procedure if the client component time period expires which indicates that the initial client value was not received at a next time on the periodic time basis dictated by the host component time period.

Another aspect of the invention provides a method of performing a reset for system recovery. The method comprises transferring an initial client value associated with a client component time period from a host component circuitry residing on a first chip to a client component circuitry residing on a second, different chip over a bus structure. The transfer is performed on a periodic time basis dictated by a host component time period, where the client component time period is greater than the host component time period. The method further initiates a reset procedure in the client component circuitry if a next initial client value is not transferred to the client component circuitry prior to an expiration of the client component time period.

The following description and annexed drawings set forth in detail certain illustrative aspects and implementations of the invention. These are indicative of but a few of the various ways in which the principles of the invention may be employed.

Accordingly, the present invention provides a system and method for reducing the pin count of a microprocessor. Further, the present invention replaces a reset pin with a reset command without implying the necessity for the client component circuitry to monitor the control bus in order to ensure control of the system. These and other advantages of the present invention not specifically recited above will become apparent within discussions of the present invention herein.

DETAILED DESCRIPTION OF THE INVENTION

Figure 1:
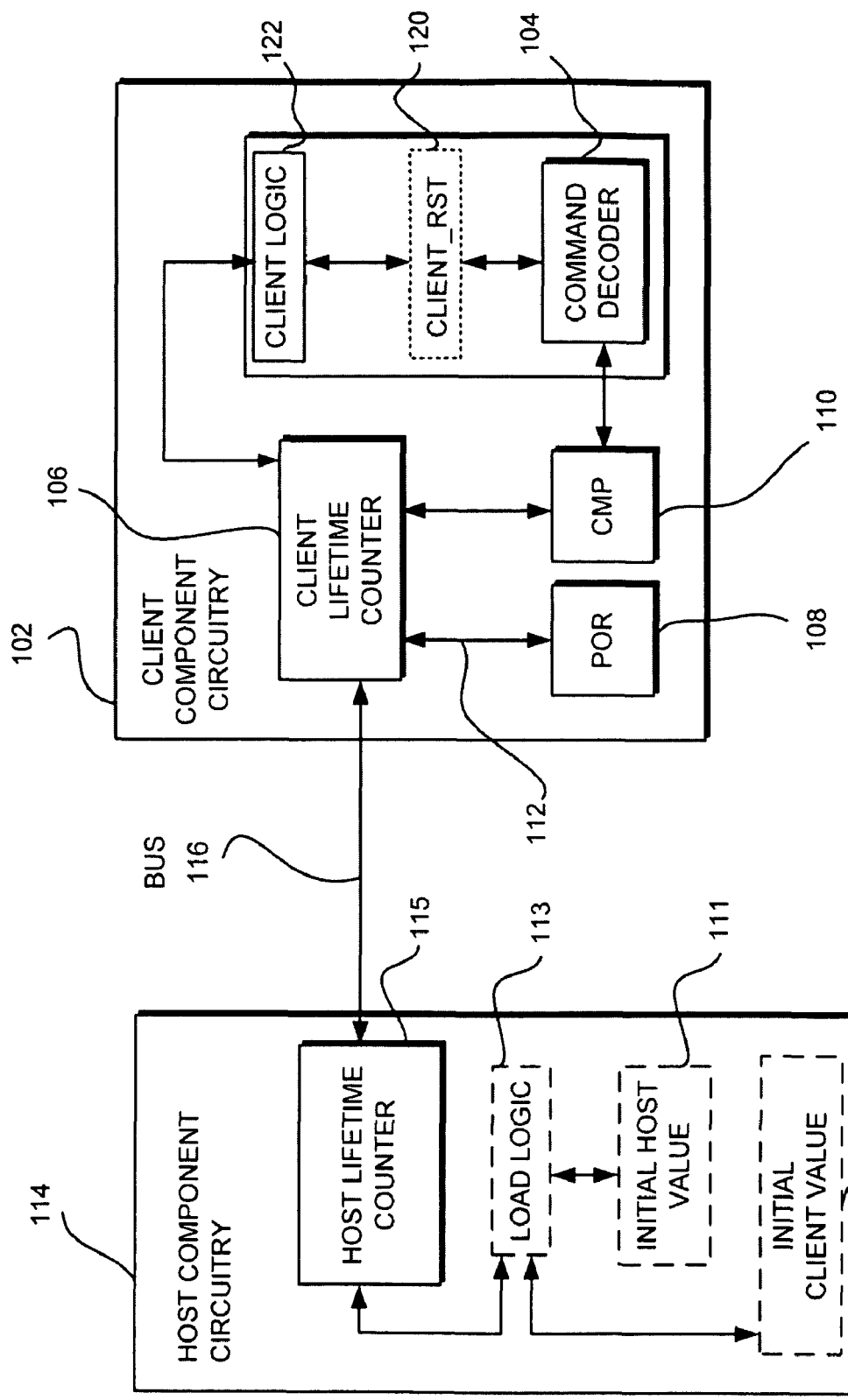
FIG. 1 is a schematic diagram illustrating communication between a host component circuitry and a client component circuitry in accordance with at least one aspect of the present invention.

One or more implementations of the present invention will now be described with reference to the drawings, wherein like reference numerals are used to refer to like elements throughout. One or more aspects of the invention are hereinafter illustrated and described in the context of an exemplary system and method for replacing a separate reset pin in buses while guaranteeing system recovery.

In one exemplary embodiment, as illustrated in FIG. 1, a system 100 is disclosed for replacing a separate reset pin in a bus with a reset command in order to guarantee system recovery (e.g., between a client and a host). In one embodiment, the system 100 comprises a host component circuitry 114 residing on a first chip, for example, that comprises a host lifetime counter 115, load logic 113, an initial host value 111, and an initial client value 117. The host component circuitry 114 is configured to transfer the initial client value 117 associated with a client component time period to a client component circuitry 102 over a bus 116. The transfer of the initial client value 117 takes place on a periodic basis that is dictated by a host component time period. In one embodiment, the load logic 113 initially loads the initial client value 117 into the host lifetime counter 115 upon an initial system startup, wherein the host lifetime counter 115 loads the initial client value 117 into the client lifetime counter 106 across the bus 116.

The client component circuitry 102 comprises the client lifetime counter 106 and the client component circuitry 102 is configured to communicate with a power-on-reset (POR) 108 and a comparator (CMP) 110. Subsequently, the initial host value 111 is loaded by the load logic 113 into the host lifetime counter 106.

The host lifetime counter 115 and the client lifetime counter 106, in one embodiment, are configured to simultaneously decrement from a host start count and a client start count, respectively. Both the host lifetime counter 115 and the client lifetime counter 106, decrement by a decrement value. The client lifetime counter 106 is configured to decrement by the decrement value from a client start count to a client end count that is equal to the client component time period. The host lifetime counter 115 is configured to decrement by the decrement value from a host start count to the host end count that is equal to the host component time period, discussed supra.

The host component time period normally dictates the reset because the host component time period is less than the client component time period. Therefore, the host component circuitry 114 reloads a next initial client value 117 into the client lifetime counter 106 on a periodic basis because the host lifetime counter 115 reaches the end count prior to the client lifetime counter 106, unless there is a reset condition. In other words, the initial client value 117 and the initial host value 111 are reloaded on a periodic basis as long as the host component circuitry 114 and the client component circuitry 102 remain connected.

In one embodiment, the power-on-reset 108 can provide a known state within the client component circuitry 102 (e.g., a processor chip) and this can ensure that the initial state of the client component circuitry 102 is always defined. The client component circuitry 102 and the host component circuitry 114 applications, for example, may be applications that are executed via the client component circuitry 102 and/or the host component circuitry 114, respectively.

In at least one embodiment, the client component circuitry 102 comprises a command decoder 104 and the client lifetime counter 106. The bus 116 is configured to connect the host lifetime counter 115 and the client lifetime counter 106. Of course, those skilled in the art will recognize many modifications may be made to this configuration, without departing from the scope or spirit of what is described herein.

The client component circuitry 102 will be reset if the client component circuitry 102 and the host component circuitry 114 lose connection. In this case, the host component circuitry 114 is not able to load the initial client value 117 into the client lifetime counter 106 because of the lost connection. Therefore, the client lifetime counter 106 is able to decrement by the decrement value from the client start count to the client end count, which triggers a client reset 120.

The comparator 110 is configured to compare the decremented client value (i.e., a count) to a reference value and in one example, if the decremented client value is equal to, for example, zero or the client end count then the comparator 110 sends a client reset signal to a command decoder 104 that is configured to issue a client reset 120 to a client logic 122.

For example, as discussed supra, in order to prevent unwanted client resets triggered by the client lifetime counter 106 (i.e., decrementing to zero or the a predetermined value) that would normally require a separate reset pin, the host lifetime counter 115 decrements the host count to zero or to the host end count sooner than the client lifetime counter 106 decrements the initial client value 117 to zero or to the client end count. Therefore, if the host component circuitry 114 and the client component circuitry 102 remain connected, the client lifetime counter 106 and the host lifetime counter 115 are being reset to the initial client value 117 and the initial host value 111, respectively on a periodic time basis (e.g., once per second).

Still referring to FIG. 1, the power-on-reset 108 can further initialize the client lifetime counter 106 to zero upon a client component circuitry reset, for example, to clear out the memory registers, and the like. The client logic 122 can be configured to perform logic commands and fundamental operations within the client component circuitry 102. In one embodiment, the power-on-reset 108 is configured to generate a reset signal to the client lifetime counter 106 independent of a command decoder 104 during the client reset.

In yet another embodiment, the power-on-reset 108 is configured to generate the client reset signal through the client reset 120 to the client lifetime counter 106 independent of the command decoder 104. The system has the command decoder 104 to which bits of commands can be supplied in parallel, and which decodes the internal command signals from the commands. The comparator 110 can be an op-amp circuit that compares two inputs and provides a DC output indicating the polarity relationship between the inputs to the command decoder 104. In another embodiment, the comparator 110 compares two data inputs and indicates the result of that comparison in an analogue device. The comparator 110 can be a functional unit that compares two analog variables and indicates the result of that comparison to the command decoder 104.

Figure 2:
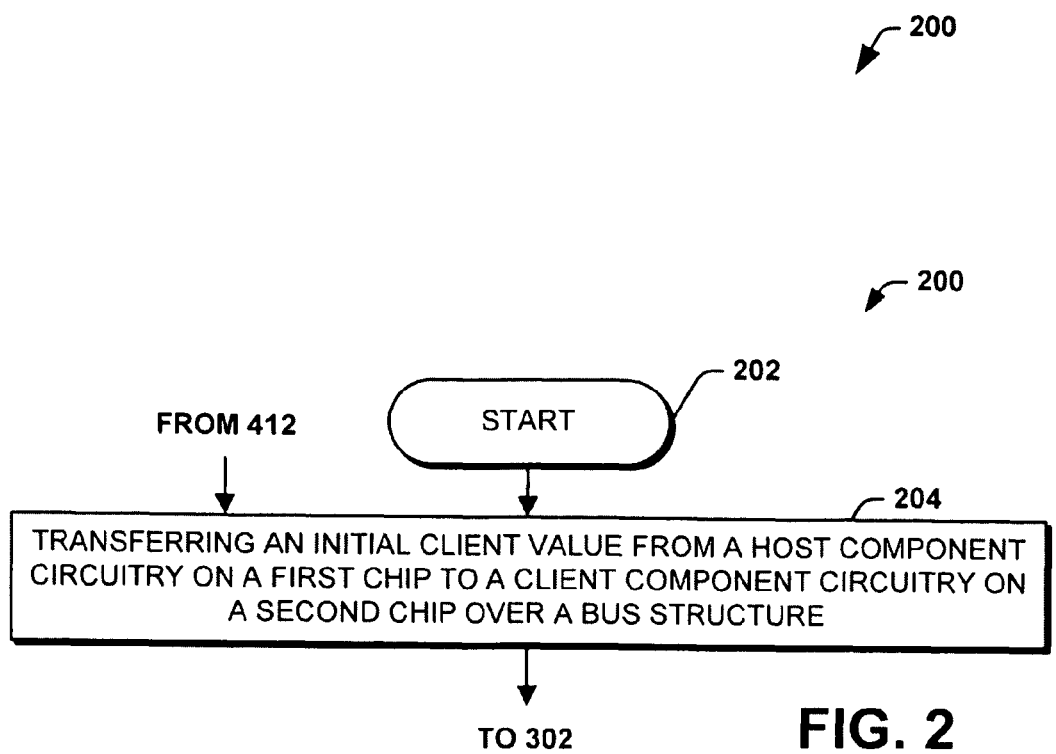
FIG. 2 is a flow diagram illustrating an exemplary methodology for replacing a separate reset pin in buses while guaranteeing system recovery in accordance with one or more aspects of the present invention.
Figure 3:
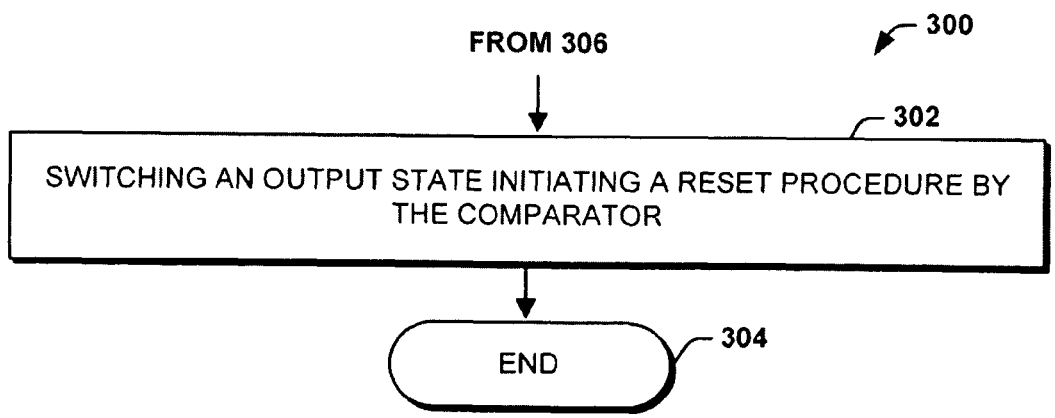
FIG. 3 is a flow diagram illustrating yet another exemplary methodology for replacing a separate reset pin in buses while guaranteeing system recovery in accordance with one or more aspects of the present invention.
Figure 4:
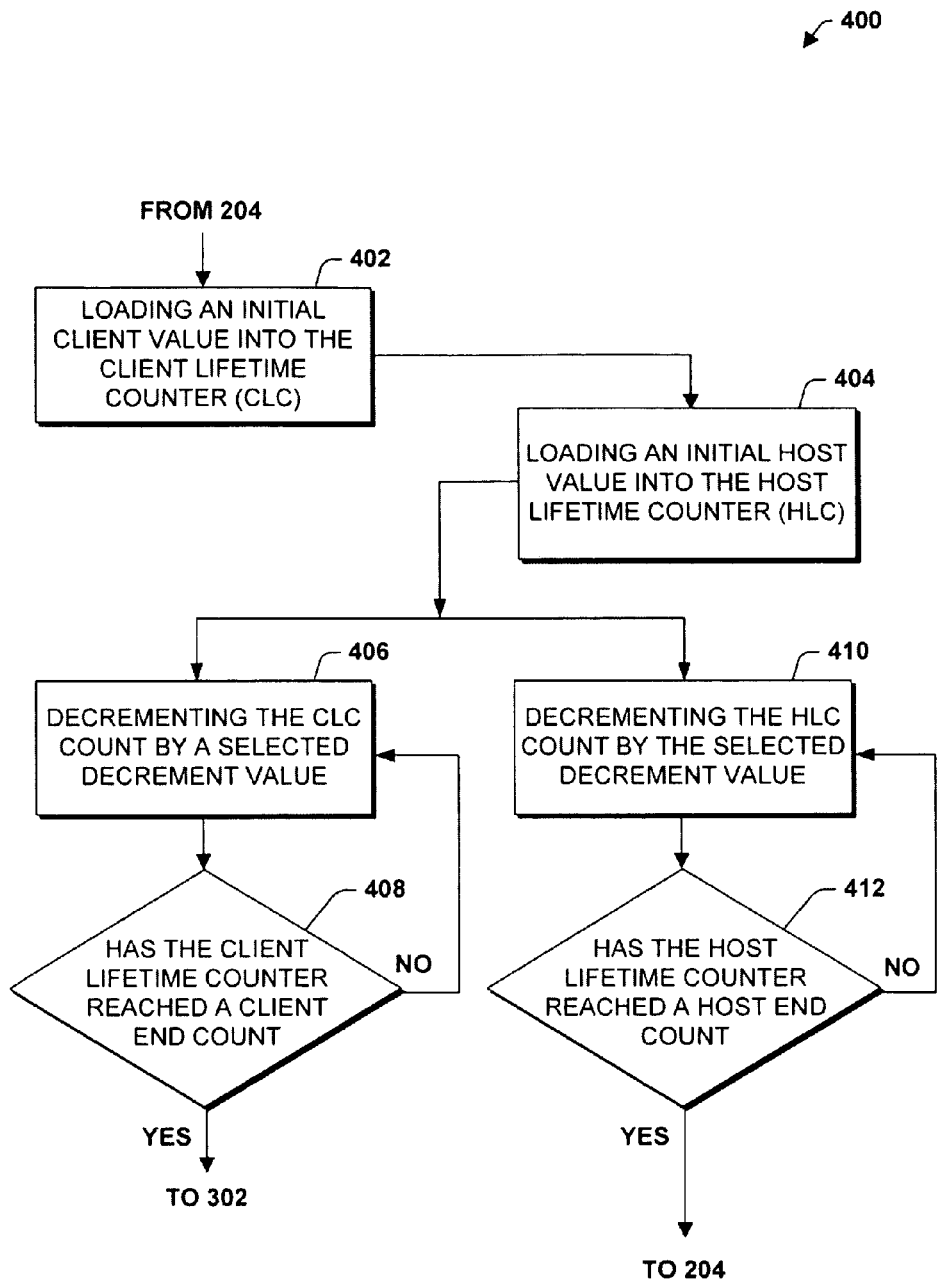
FIG. 4 is yet another flow diagram illustrating an exemplary methodology for replacing a separate reset pin in buses while guaranteeing system recovery in accordance with one or more aspects of the present invention.

A method 200 is illustrated in FIG. 2 and will be explained with respect to FIGS. 1, 3 and 4, for example. The method 200 begins at 202 wherein the method 200 at 204 transfers an initial client value 117 associated with a client component time period from a host component circuitry 114 to a client component circuitry 102 over a bus 116. In one embodiment, the host component circuitry 114 can reside on a first chip and the client component circuitry 102 can reside on a second chip, different from the first chip. The transfer is performed on a periodic time basis dictated by a host component time period, wherein the client component time period is greater than the host component time period. The method 200 continues, as illustrated in FIG. 4 at 402 where a method 400 involves loading the initial client value 117 into a client lifetime counter 106 at 402. At 404 an initial host value is loaded into a host lifetime counter 115. In one embodiment, for example load logic 113 can be utilized to load the initial client value 117 into the host lifetime counter 115 and the initial host value 117 into the host lifetime counter 115 once the initial client value 117 is transferred across the bus 116.

A decrementing of the client lifetime counter 106 and decrementing of the host lifetime counter 115 occur concurrently as shown in method 400. This is illustrated by the single line with joint arrows pointing to 406 and 410. At 406 the client lifetime counter (CLC) 106 is decremented by the selected decrement value and at 410 the host lifetime counter (HLC) 106 is concurrently decremented by the selected decrement value. At 412 the method 400 determines if the host lifetime counter 115 has reached a host end count, in addition at 408 the method 400 determines if the client lifetime counter 106 has reached a client end count. If the host lifetime counter 115 has reached a host end count at 412 then the method 400 returns to method 200 at 204 as illustrated in FIG. 2. If the host lifetime counter 115 has not reached the host end count at 412 the method 400 returns to 410 where the host lifetime counter 115 count is again decremented by the selected decrement value. At 408 if the client lifetime counter 106 has not reached the client end count at 408 the method 400 returns to 406 where the client lifetime counter 115 count is again decremented by the selected decrement value. However, if at 408 the client lifetime counter 106 has reached the client end count, the method 400 proceeds to FIG. 3 at 302 of method 300. At 302 a comparator switches an output state which initiates a reset procedure the re-establish connection, wherein the method ends at 304.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The following is claimed:

1. A system providing a reset for system recovery, comprising:

a host component circuitry residing on a first chip;

a client component circuitry residing on a second, different chip; and a bus connecting the host component circuitry to the client component circuitry;

wherein the host component circuitry is configured to transfer an initial client value associated with a client component time period to the client component circuitry over the bus on a periodic time basis dictated by a host component time period, and wherein the client component time period is greater than the host component time period, wherein the client component circuitry is configured to initiate a reset procedure if the client component time period expires, thereby indicating that the initial client value was not received a next time on the periodic time basis dictated by the host component time period.

2. The system of claim 1, wherein the client component circuitry further comprises a client lifetime counter configured to receive the initial client value and perform a count associated therewith, wherein a time to perform the count is equal to the client component time period.

3. The system of claim 2, wherein the client lifetime counter is configured to decrement from a start count associated with the initial client value to a client end count, wherein a time to decrement from the start count to the end count is equal to the client component time period.

4. The system of claim 3, wherein the client component circuitry further comprises a comparator configured to compare a count of the client lifetime counter to a reference value, wherein when the client lifetime counter reaches the end count, the comparator switches an output state thereof, thereby initiating the reset procedure.

5. The system of claim 4, wherein the client component circuitry further comprises client logic configured to execute the reset procedure in the client component circuitry.

6. The system of claim 2, wherein the host component circuitry further comprises a host lifetime counter configured to load an initial host value therein, wherein the initial host value is associated with the host component time period.

7. The system of claim 6, wherein the host lifetime counter is configured to decrement from a start count associated with the initial host value to a host end count, wherein a time to decrement from the start count to the end count is equal to the host component time period.

8. The system of claim 7, wherein the client lifetime counter and the host lifetime counter are decremented by a decrement value concurrently.

9. The system of claim 6, wherein the host component circuitry is further configured to transfer the initial client value to the client component circuitry over the bus when the host lifetime counter reaches the host end count.

10. The system of claim 6, wherein a power-on-reset is configured to generate a reset signal to the client lifetime counter independent of a command decoder during the client reset.

11. The system of claim 1, wherein the reset procedure is initiated by the client component circuitry if a next initial client value is not transferred to the client component circuitry prior to an expiration of the client component time period.

12. A method of performing a reset for system recovery, comprising:

transferring an initial client value associated with a client component time period from a host component circuitry residing on a first chip to a client component circuitry residing on a second, different chip over a bus structure, wherein the transfer is performed on a periodic time basis dictated by a host component time period, wherein the client component time period is greater than the host component time period; and initiating a reset procedure in the client component circuitry if a next initial client value is not transferred to the client component circuitry prior to an expiration of the client component time period.

13. The method of claim 12, wherein the client component circuitry further comprises a client lifetime counter to receive the initial client value and performing a count associated therewith, wherein a time for performing the count is equal to the client component time period.

14. The method of claim 13, wherein the client lifetime counter is configured decrementing from a start count associated with the initial client value to a client end count, wherein a time for decrementing from the start count to the end count is equal to the client component time period.

15. The method of claim 14, wherein the client component circuitry further comprising a comparator configured to compare a count of the client lifetime counter to a reference value, wherein when the client lifetime counter reaches the end count, switching the output state of the comparator, thereby initiating the reset procedure.

16. The method of claim 15, wherein the client component circuitry further comprising configuring client logic to execute the reset procedure in the client component circuitry.

17. The method of claim 13, wherein the host component circuitry further comprises a host lifetime counter configured to load an initial host value therein, wherein the initial host value is associated with the host component time period.

18. The method of claim 17, wherein the host lifetime counter is configured to decrement from a start count associated with the initial host value to a host end count, wherein a time to decrement from the start count to the end count is equal to the host component time period.

19. The method of claim 18, wherein decrementing of the client lifetime counter by a decrement value and decrementing of the host lifetime counter by the decrement value occur concurrently.

20. The method of claim 17, wherein the host component circuitry is further configured to transfer the initial client value to the client component circuitry over the bus when the host lifetime counter reaches the host end count.

21. The method of claim 17, wherein a power-on-reset is configured to generate a reset signal to the client lifetime counter independent of a command decoder during the client reset.

* * * * *